M. McCARTY.
PORTABLE HAY PRESS.

No. 170,636.

Patented Nov. 30, 1875.

WITNESSES:
F. McArdle,
Alex F. Roberts

INVENTOR:
M. McCarty
BY
ATTORNEYS.

UNITED STATES PATENT OFFICE.

MICHAEL McCARTY, OF PUEBLO, COLORADO TERRITORY.

IMPROVEMENT IN PORTABLE HAY-PRESSES.

Specification forming part of Letters Patent No. 170,636, dated November 30, 1875; application filed October 23, 1875.

*To all whom it may concern:*

Be it known that I, MICHAEL McCARTY, of Pueblo, in the county of Pueblo and Territory of Colorado, have invented a new and Improved Portable Press, of which the following is a specification:

The invention is an improvement in that class of presses whose follower is operated vertically by means of rods worked by chains and windlass or equivalent means.

The improvement consists, first, in jointing the rods to enable the follower to be tilted to one side of the top of the press-case, to allow the hay or other material to be inserted; and, second, the invention relates to means for fastening the door of the case out of which the bales are discharged.

Figure 1:
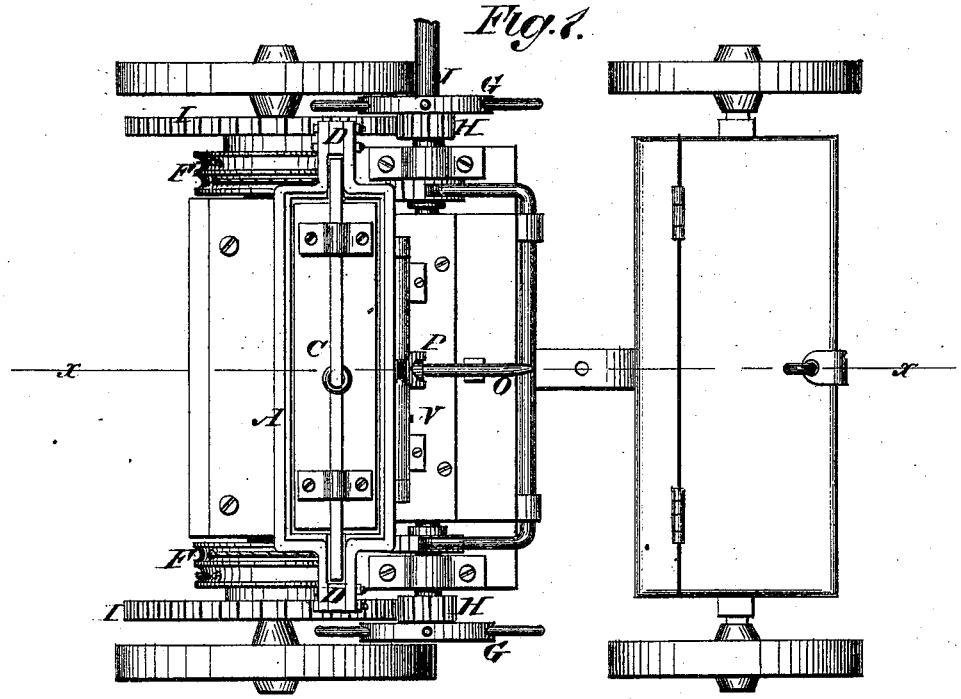
Figure 2:
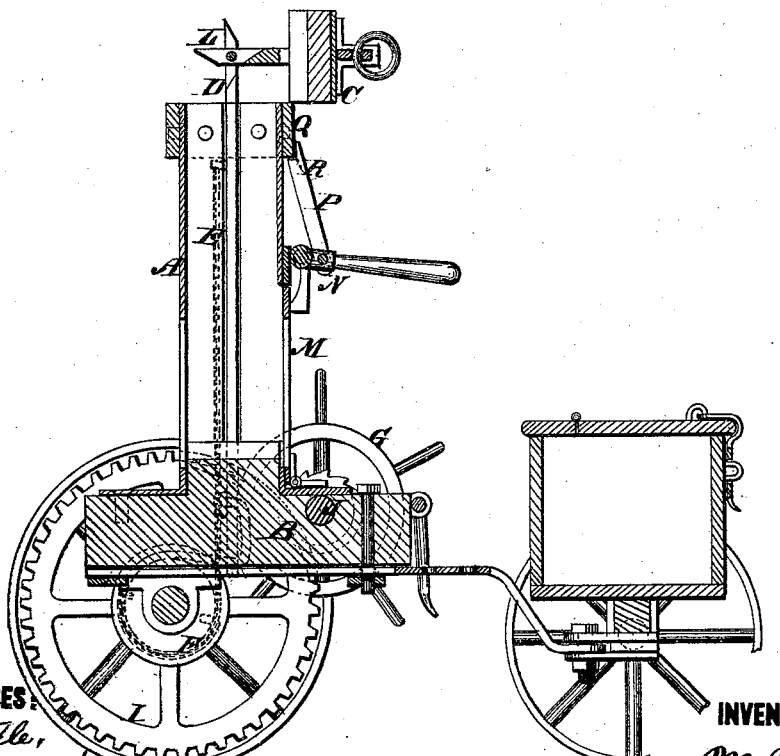

Figure 1 is a top view of my improved press, and Fig. 2 is a sectional elevation taken on the line $x$ $x$ of Fig. 1.

Similar letters of reference indicate corresponding parts.

A represents the vertical press-case, which is erected on a strong base, B, that is mounted on the hind portion of a truck for moving the press about from place to place. C is the follower; D, rods for working the follower; E, chains for working said rods; F, drums for working the chains; G, hand-wheels; H, pinions, and I wheels for working the drums. The hand-wheels and pinions are on a shaft, J, arranged in suitable bearings in the bed-piece B, and extending across the truck from side to side, so that power can be applied at both sides, and at one end the shaft projects, so that a pulley and a rope may be applied for the use of horse-power to work the press.

The wheels I are fitted on the axle of the truck so as to turn loosely, to work the press when the truck is at rest.

Instead of the drums and chains for working the bars D, the latter may be toothed, and gear with pinions connected with the wheels I.

K represents holes to be made in the ground, to allow the bars room for sliding down to work the follower. The bars are jointed at L, to allow the follower to swing over to one side of the press-case to open it for stuffing. The fastening for the door consists of the shaft N, with lugs M and handle O, and the fastening-dog P.

By the lever the lugs are pressed hard against the door to hold it, and let the dog P drop under the cross-bar Q at R, to hold the lugs.

The press is designed more particularly for pressing hay from stacks, by the side of which the case is to be adjusted, so as to pitch down into it; but the hay may also be pitched up into it from the ground.

Having thus described my invention, I claim as new and desire to secure by Letters Patent—

1. The combination, with the follower and vertical press-case, of the bars D, jointed at L, as shown and described, to enable said follower to tilt, in the manner specified.

2. The shaft N, lugs M, lever O, and locking-dog P, combined and arranged with the door, substantially as specified.

MICHAEL McCARTY.

Witnesses:
M. G. BRADFORD,
THOMAS W. SAYLES.